(12) United States Patent
Takahashi (10) Patent No.: US 9,415,731 B2
(45) Date of Patent: Aug. 16, 2016

(54) ROTARY CONNECTOR

(71) Applicant: ALPS ELECTRIC CO., LTD., Tokyo (JP)

(72) Inventor: Seishi Takahashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 14/680,521

(22) Filed: Apr. 7, 2015

(65) Prior Publication Data

US 2015/0314739 A1    Nov. 5, 2015

(30) Foreign Application Priority Data

May 1, 2014    (JP) .................................. 2014-094600
Jan. 30, 2015  (JP) .................................. 2015-017434

(51) Int. Cl.
  *B60R 16/027*    (2006.01)
  *H02G 11/00*     (2006.01)
  *H01R 35/02*     (2006.01)
  *H02G 11/02*     (2006.01)

(52) U.S. Cl.
  CPC ............ *B60R 16/027* (2013.01); *H01R 35/025* (2013.01); *H02G 11/00* (2013.01); *H02G 11/02* (2013.01)

(58) Field of Classification Search
  USPC .................. 439/15, 164; 200/61.54; 475/347
  See application file for complete search history.

(56) References Cited

U.S. PATENT DOCUMENTS

| | | | | |
|---|---|---|---|---|
| 5,046,951 A * | 9/1991 | Suzuki | ........................... | 439/15 |
| 5,174,515 A * | 12/1992 | Meier | ........................... | 242/388 |
| 5,224,871 A * | 7/1993 | Ida et al. | ........................ | 439/164 |
| 5,252,085 A * | 10/1993 | Kato et al. | .................... | 439/164 |
| 5,259,775 A * | 11/1993 | Kubota et al. | ................ | 439/164 |
| 5,314,344 A * | 5/1994 | Ida et al. | ........................ | 439/164 |
| 5,637,005 A * | 6/1997 | Bannai et al. | ................. | 439/164 |
| 5,882,216 A * | 3/1999 | Matsumoto et al. | .......... | 439/164 |
| 5,888,084 A * | 3/1999 | Mukai et al. | .................. | 439/164 |
| 5,890,921 A * | 4/1999 | Kuroda et al. | ................. | 439/164 |
| 6,012,935 A * | 1/2000 | Bolen et al. | ................... | 439/164 |
| 6,213,797 B1 * | 4/2001 | Best et al. | ..................... | 439/164 |
| 6,354,854 B1 * | 3/2002 | Matsuzaki | .................... | 439/164 |
| 6,780,032 B2 * | 8/2004 | Rhein et al. | ................... | 439/164 |
| 7,192,293 B2 * | 3/2007 | Wasalaski | .................... | 439/164 |
| 7,393,222 B2 * | 7/2008 | Asakura | ........................ | 439/164 |
| 7,811,108 B2 * | 10/2010 | Oishi et al. | .................... | 439/164 |
| 8,727,936 B2 | 5/2014 | Asakura et al. | | |

FOREIGN PATENT DOCUMENTS

JP    04-333472    11/1992
JP    2012-209253  10/2012

* cited by examiner

*Primary Examiner* — Alexander Giman
(74) *Attorney, Agent, or Firm* — Brinks Gilson & Lione (57) ABSTRACT

When a movable reel is rotated, a rotating ring is rotated following the rotation of the movable reel. An annular elastic member is fitted to a support on the rotating ring. In a laying-out space, a cable is pressed by a first elastic belt portion and a second elastic belt portion of the annular elastic member. As a result, a reversing portion of the cable can keep its shape constant. Since the annular elastic member is able to circle around the support following the movement of the rotating ring, damage of the cable can be reduced.

8 Claims, 9 Drawing Sheets

ROTARY CONNECTOR

CLAIM OF PRIORITY

This application claims benefit of priority to Japanese Patent Application No. 2014-094600 filed on May 1, 2014 and No. 2015-017434 filed on Jan. 30, 2015, which are hereby incorporated by reference in its entirety.

BACKGROUND

1. Field of the Disclosure

The present disclosure relates to a rotary connector mounted to a steering column of an automobile, for example, and more particularly to a rotary connector allowing a cable to be smoothly moved between a stationary case and a movable reel.

2. Description of the Related Art

In a steering column of an automobile, it is required, between a stationary unit and a rotating unit, to supply electric power for operating an airbag and to transmit switching signals from a horn switch and other various control switches. A rotary connector is used to meet such needs.

In a rotary connector disclosed in Japanese Unexamined Patent Application Publication No. 2012-209253, a movable housing is rotatably disposed inside a stationary housing, and a rotating ring member is disposed between the stationary housing and the movable housing. The stationary housing includes an internal gear, the movable housing includes a sun gear, and the rotating ring member rotatably supports a planetary gear. The planetary gear is meshed with both the internal gear and the sun gear. When the movable housing is rotated, the planetary gear is also rotated by the sun gun that is rotated together with the movable housing. Thus, the rotating ring member is rotated at a rotational speed lower than that of the movable housing.

Opposite ends of a flat cable are fixed respectively to the stationary housing and the movable housing. The flat cable is disposed to extend along an inner peripheral surface of the stationary housing, and to pass a reverse maintaining portion, which is provided in the rotating ring member, to be reversed. The flat cable is then wound over an outer peripheral surface of the movable housing.

According to the above-described rotary connector, when the movable housing is rotated, the rotating ring member is rotated at a decelerated speed following the rotation of the movable housing. Therefore, a reversing portion of the flat cable can be guided in a rotating direction by the reverse maintaining portion that is rotated together with the rotating ring member.

In a cable reel disclosed in Japanese Unexamined Patent Application Publication No. 4-333472, a flexible cable is arranged in a space between an inner peripheral surface of a stationary member and an outer peripheral surface of a movable member. The flexible cable is arranged along the inner peripheral surface of the stationary member, and after being reversed within the space, it is wound over the outer peripheral surface of the movable member. An elastic ring is disposed in the space to be gripped by the reversing flexible cable in an embraced state.

In the above-mentioned cable reel, when the movable member is rotated, a reversing portion of the flexible cable is moved in the space. At that time, however, the elastic ring gripped by the flexible cable is caused to rotate on its axis due to friction between the elastic ring and the flexible cable. Because the elastic ring moves while rotating on its axis, the reversing portion of the flexible cable can be guided by the elastic ring. As a result, a winding operation and an unwinding operation of the movable cable can be performed reliably.

In the rotary connector disclosed in Japanese Unexamined Patent Application Publication No. 2012-209253, when the movable housing is rotated, the reverse maintaining portion provided in the rotating ring member is also rotated, and the reversing portion of the flat cable is guided by the reverse maintaining portion. At that time, the reversing portion of the flat cable always slides against the reverse maintaining portion. There is hence a possibility that the flat cable may wear when used for a long term. In consideration of such a possibility, a lubricant is usually applied to the reverse maintaining portion to reduce a frictional force generated between the reverse maintaining portion and the flat cable. However, the lubricant of the type used in automobiles for that purpose needs to be superior in temperature characteristics, etc. and is very expensive. This causes a problem of increasing the cost of the rotary connector.

In the cable reel disclosed in Japanese Unexamined Patent Application Publication No. 4-333472, the elastic ring capable of freely moving in the state gripped by the reversing portion of the flexible cable is disposed in the space between the stationary member and the movable member. The elastic ring is rotated only by the action of the frictional force between the elastic ring and the flexible cable. Accordingly, if slippage occurs between the flexible cable and the elastic ring, a rotational position of the elastic ring would be instable after the occurrence of slippage. As a result, the elastic ring can no longer guide the reversing portion of the flexible cable, and the shape of the reversing portion of the flexible cable is deformed. This causes a problem that the flexible cable cannot be stably wound and unwound in the above-mentioned space.

SUMMARY

A rotary connector includes a stationary case, a movable reel rotatably supported to the stationary case, a laying-out space defined between an inner peripheral surface of the stationary case and an outer peripheral surface of the movable reel, and a cable stored in the laying-out space and having opposite ends fixed to the stationary case and the movable reel. The rotary connector further includes a rotating ring arranged between the stationary case and the movable reel, and a power transmission mechanism that rotates the rotating ring by a rotating force of the movable reel. The rotating ring includes a first support surface and a second support surface located within the laying-out space and positioned in spaced relation from each other in a rotating direction of the rotating ring, and a first elastic belt portion and a second elastic belt portion between the first support surface and the second support surface. The first elastic belt portion is positioned opposite to the inner peripheral surface of the stationary case and the second elastic belt portion being positioned opposite to the outer peripheral surface of the movable reel. The cable extending along the inner peripheral surface of the stationary case is reversed in a reversing-cable passage region adjacent to the first support surface and is wound over the outer peripheral surface of the movable reel.

Accordingly, the cable is guided by the first elastic belt portion and the second elastic belt portion both disposed on the rotating ring that is rotatable following the rotation of the movable reel, and a reversing portion of the cable is guided by the reversing-cable passage region adjacent to the first support surface. Therefore, the cable is always stably wound over the movable reel and unwound from the movable reel. The rotating ring includes the first elastic belt portion and the second elastic belt portion, and the cable is pressed against the inner peripheral surface of the stationary case and the outer peripheral surface of the movable reel by the first and second elastic belt portions, respectively. Thus, the cable is stored in a stable state with the aid of the inner peripheral surface and the outer peripheral surface, and the shape of the reversing portion of the cable is stabilized. As a result, an excessive frictional force is prevented from being applied to the cable from the rotating ring.

DESCRIPTION OF THE EXEMPLARY EMBODIMENTS

Figure 1:
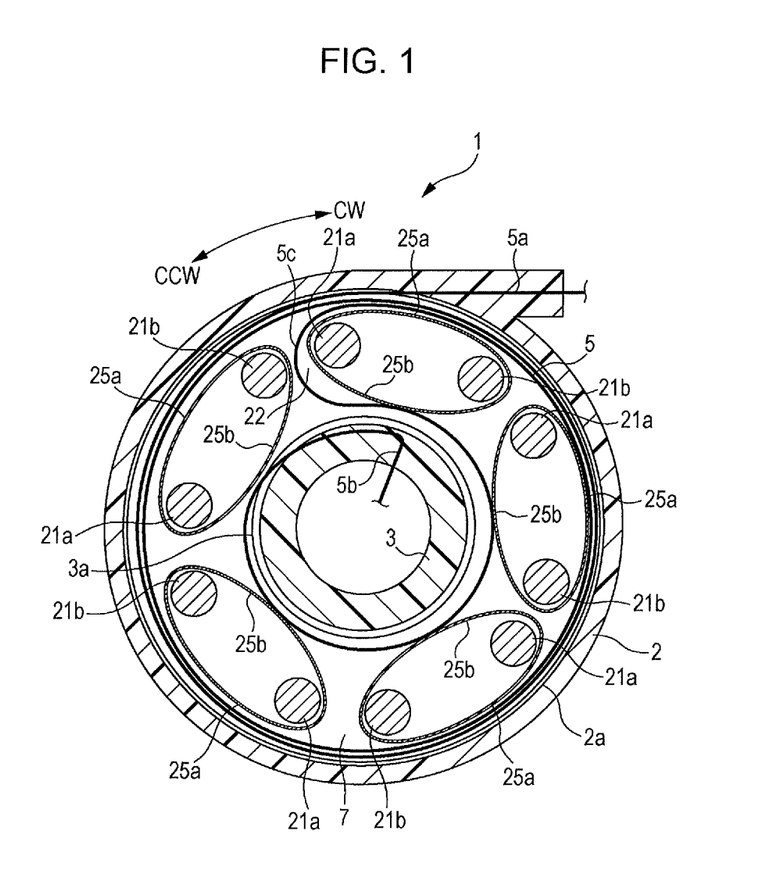
FIG. 1 is a sectional plan view illustrating an internal structure of a rotary connector according to a first embodiment of the present invention.
Figure 2:
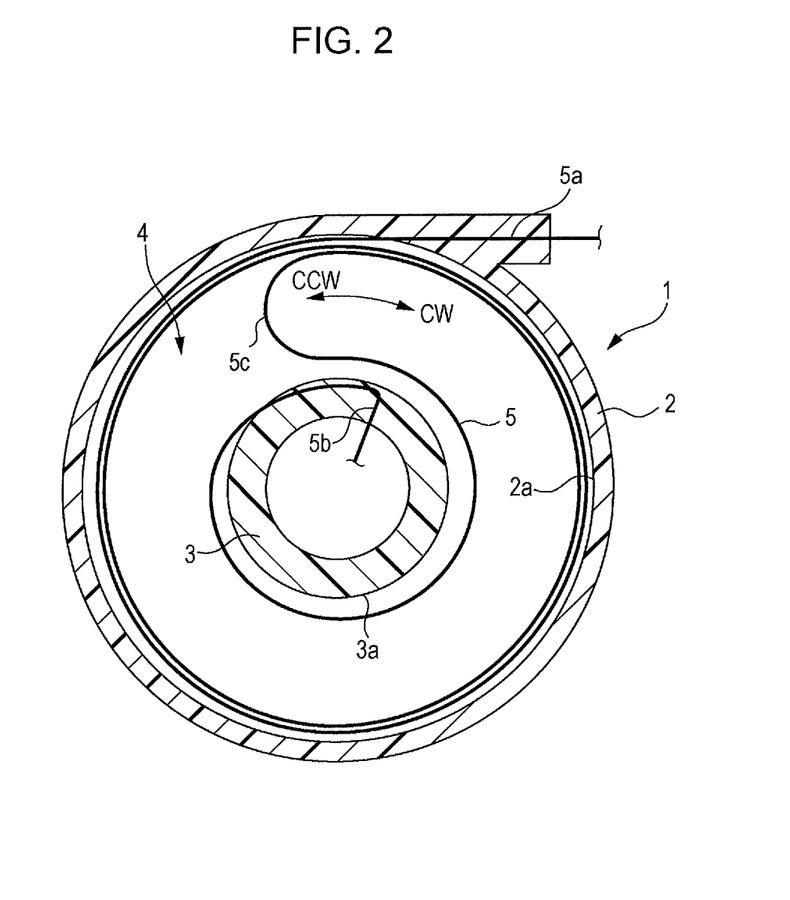
FIG. 2 is a sectional plan view illustrating a laying-out space in the rotary connector illustrated in FIG. 1 and a laid-out state of a cable therein.

The rotary connector 1 according to a first embodiment of the present invention, illustrated in FIG. 1, includes a stationary case 2 and a movable reel 3. The rotary connector 1 is mounted to a steering column of an automobile. The stationary case 2 is fixedly held, and the movable reel 3 is rotated together with the steering wheel. As illustrated in FIG. 2, a laying-out space 4 is formed between a cylindrical inner peripheral surface 2a of the stationary case 2 and a cylindrical outer peripheral surface 3a of the movable reel 3. A cable 5 is stored in the laying-out space 4. A fixed end 5a of the cable 5 is fixed to the stationary case 2, and an extending direction of the cable 5 is reversed at a reversing portion 5c of the cable 5. A movable end 5b of the cable 5 is fixed to the movable reel 3. The cable 5 is flexible and is the so-called flat cable.

While only one cable 5 is illustrated in FIGS. 1 and 2, the rotary connector 1 is able to store the cable 5 in plural number. The plural cables 5 are stored in a piled state in the laying-out space 4, and their fixed ends 5a are fixed to the stationary case 2 at different positions. The respective reversing portions 5c of the cables 5 are formed at different positions, and the respective movable ends 5b thereof are fixed to the movable reel 3 at different positions.

The rotary connector 1 supplies electric power and an operating signal, which are used to operate an airbag disposed in a steering wheel, from the stationary side to the rotating side through the cable 5. Furthermore, signals from a horn switch and various control switches, which are disposed in the steering wheel, are transmitted to the stationary side through the cable 5.

The stationary case 2 and the movable reel 3 are each made of synthetic resin. As illustrated in a sectional view of FIG. 5, the movable reel 3 is disposed in a central portion of the stationary case 2. A lower end portion 3b of the movable reel 3 is rotatably supported by a bearing 2b that is disposed in a lower portion of the stationary case 2, and a flange 3c formed in an upper portion of the movable reel 3 is rotatably supported by a flange bearing 2c that is disposed in a ceiling portion of the stationary case 2.

The cylindrical inner peripheral surface 2a of the stationary case 2 and the cylindrical outer peripheral surface 3a of the movable reel 3 are positioned in concentric relation. Accordingly, the laying-out space 4 formed between the inner peripheral surface 2a and the outer peripheral surface 3a is a ring-shaped space.

A shaft hole 6 is formed to vertically penetrate through a central portion of the movable reel 3. A rotating shaft rotatable together with the steering wheel is inserted through the shaft hole 6 and is coupled to the movable reel 3 to be rotated therewith.

Figure 3:
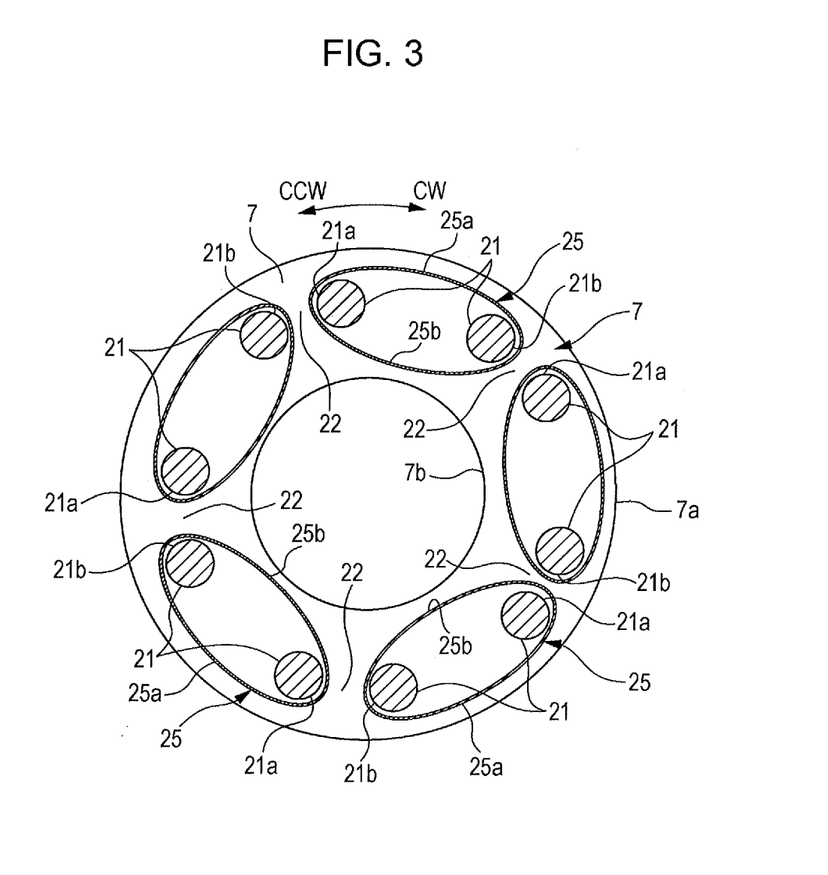
FIG. 3 is a sectional plan view illustrating a rotating ring and an annular elastic member of the rotary connector illustrated in FIG. 1.
Figure 4:
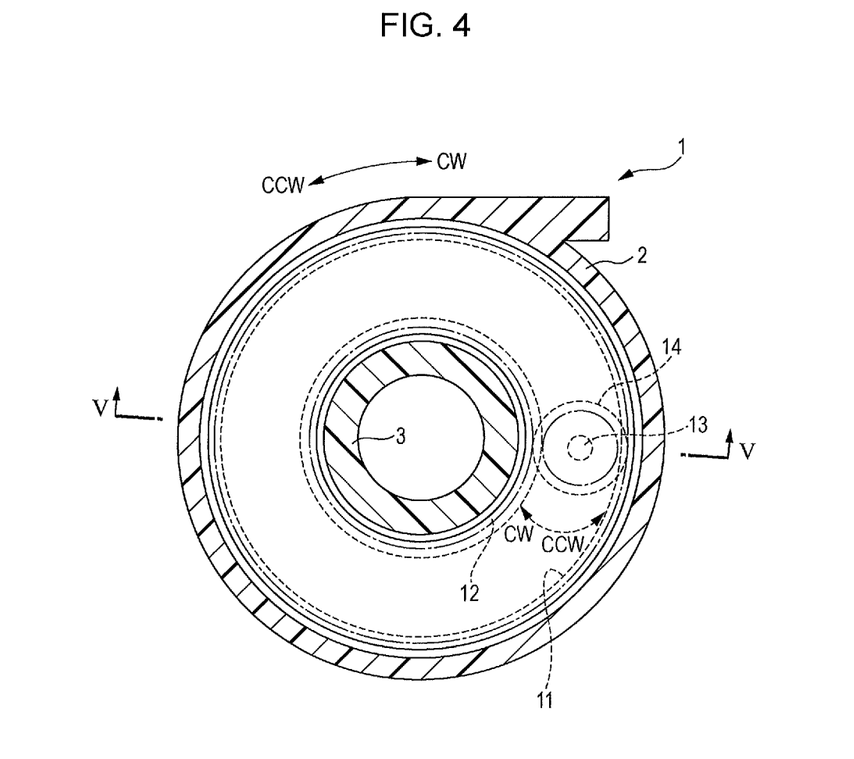
FIG. 4 is a sectional plan view illustrating a power transmission mechanism for the rotary connector illustrated in FIG. 1.
Figure 5:
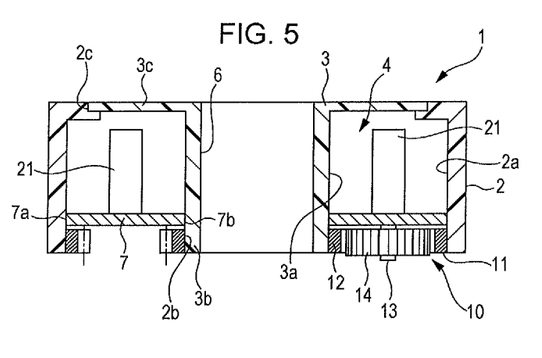
FIG. 5 is a sectional view of the rotary connector taken along a line V-V denoted in FIG. 4.

As illustrated in FIGS. 4 and 5, a rotating ring 7 is arranged at the lower side of the laying-out space 4. As seen from FIG. 3 illustrating the rotating ring 7 alone, the rotating ring 7 has a circular outer peripheral edge 7a and a circular inner peripheral edge 7b. The outer peripheral edge 7a and the inner peripheral edge 7b are rotatably supported by a lower end portion of the stationary case 2. It is to be noted that details of a support mechanism of rotatably supporting the rotating ring 7 are omitted in FIG. 5.

As illustrated in FIGS. 4 and 5, a power transmission mechanism 10 is preferably disposed in a space defined by the stationary case 2, the movable reel 3, and the rotating ring 7. A rotational force of the movable reel 3 is transmitted to the rotating ring 7 through the power transmission mechanism 10 after being decelerated.

The power transmission mechanism 10 preferably includes an internal gear 11 fixed to the stationary case 2, and a sun gear 12 fixed to the lower end portion of the movable reel 3. A support shaft 13 is fixed to the underside of the rotating ring 7, and a planetary gear 14 is rotatably supported by the support shaft 13. The planetary gear 14 is meshed with both the internal gear 11 and the sun gear 12.

In FIG. 4, when the movable reel 3 is rotated in a CW (clockwise) direction, a resulting rotational force is transmitted to the planetary gear 14 from the sun gear 12, and the planetary gear 14 is caused to rotate on its axis in a CCW (counterclockwise) direction. Moreover, because the planetary gear 14 is meshed with the internal gear 11, it revolves about the sun gear 12 in the CCW direction. As a result, the rotational force of the movable reel 3 is transmitted to the rotating ring 7 after being decelerated, and the rotating ring 7 is rotated in the CW direction. Conversely, when the movable reel 3 is rotated in the CCW direction, the planetary gear 14 is caused to rotate on its axis in the CW direction, and the rotating ring 7 is rotated in the CCW direction at a decelerated speed.

As illustrated in FIGS. 1 and 3, plural sets of supports 21 are fixedly disposed on the rotating ring 7, and those supports 21 are positioned within the laying-out space 4.

The supports 21 are each constituted by a pair of support columns. The support 21 has a first support surface 21a facing in the CCW direction, and a second support surface 21b facing in the CW direction. The first support surface 21a is an outer peripheral surface (columnar surface) of the support column, which is positioned at one end of the support 21 in the CCW direction, the outer peripheral surface facing in the CCW direction, and the second support surface 21b is an outer peripheral surface (columnar surface) of the support column, which is positioned at the other end of the support 21 in the CW direction, the outer peripheral surface facing in the CW direction.

Figure 7A:
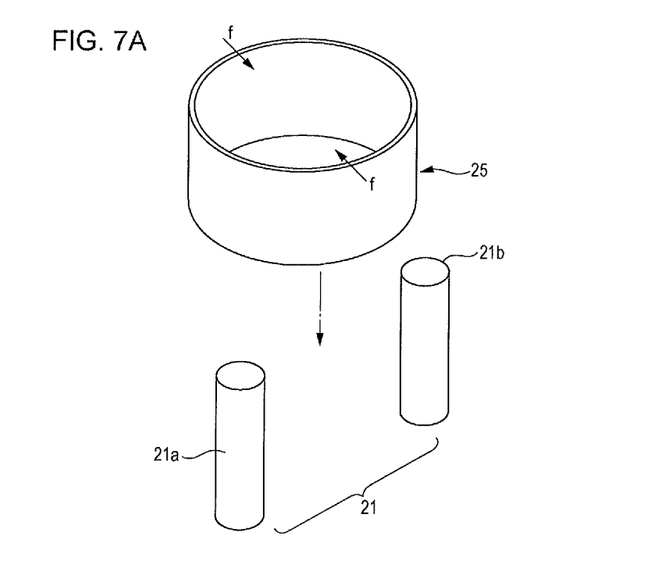
FIG. 7A is an exploded perspective view illustrating an annular elastic member and a support disposed on the rotating ring.

An annular elastic member 25 is fitted to each of the supports 21. As illustrated in FIG. 7A, the annular elastic member 25 is a belt-like member made of a synthetic resin material and formed into a continuous annular shape, and it has a substantially cylindrical shape in a free state. The annular elastic member 25 is made of, e.g., an ethylene-based resin such as PET (polyethylene terephthalate), an olefin-based resin such as polyethylene or polypropylene, or a polycarbonate resin.

Preferably, the annular elastic member 25 holds the substantially cylindrical shape in the free state as illustrated in FIG. 7A, but the annular elastic member 25 is able to generate a restoring reaction force when a force is applied to the annular elastic member 25 in a direction f to contract it in a radial direction. Furthermore, the belt material forming the annular elastic member 25 is preferably not stretchable in itself.

Figure 7B:
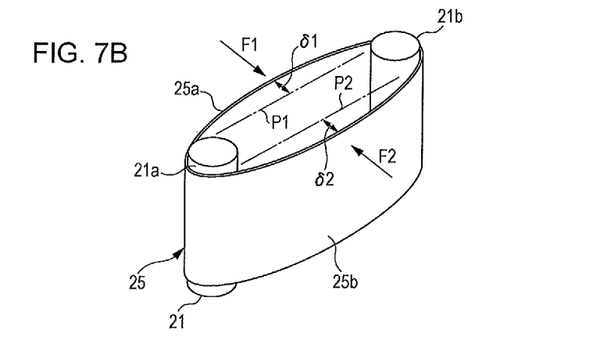
FIG. 7B is a perspective view illustrating a state where the annular elastic member is fitted to the support.

As illustrated in FIG. 7B, preferably, when the annular elastic member 25 is fitted to extend between the first support surface 21a and the second support surface 21b, a first elastic belt portion 25a and a second elastic belt portion 25b, which are parts of the annular elastic member 25, are formed between the first support surface 21a and the second support surface 21b. As illustrated in FIG. 1, the first elastic belt portion 25a is positioned opposite to the inner peripheral surface 2a of the stationary case 2, and the second elastic belt portion 25b is positioned opposite to the outer peripheral surface 3a of the movable reel 3.

As illustrated in FIG. 7B, the first elastic belt portion 25a is curved in a shape projecting outwards by δ1 from a plane P1 that interconnects respective lateral surfaces of the support columns of the support 21 on one (outer) side. Similarly, the second elastic belt portion 25b is curved in a shape projecting outwards by δ2 from a plane P2 that interconnects respective lateral surfaces of the support columns of the support 21 on the other (inner) side. Accordingly, when forces F1 and F2 acting to reduce δ1 and δ2 are applied to the first elastic belt portion 25a and the second elastic belt portion 25b, respectively, elastic forces acting to react against the forces F1 and F2 are generated.

Moreover, when a rotational force is applied to the annular elastic member 25, the annular elastic member 25 is preferably able to circle around the support 21 while sliding over the first support surface 21a and the second support surface 21b.

As illustrated in FIGS. 1 and 3, a space between two adjacent supports 21 on the rotating ring 7 serves as a reversing-cable passage region 22. In other words, a space between one annular elastic member 25, which covers the first support surface 21a of one support, and another annular elastic member 25, which covers the second support surface 21b of another support adjacent to the one support, serves as the reversing-cable passage region 22.

As illustrated in FIG. 1, the reversing portion 5c of the cable 5 stored in the laying-out space 4 passes through the reversing-cable passage region 22. As described above, the plural cables 5 can be stored in the laying-out space 4. As illustrated in FIG. 3, the reversing-cable passage region 22 is positioned in plural number over the rotating ring 7. Thus, when the plural cables 5 are stored, the respective reversing portions 5c of the cables 5 are arranged to pass through the different reversing-cable passage regions 22.

The operation of the rotary connector 1 will be described below.

When the movable reel 3 is rotated in the CCW direction, the rotation of the movable reel 3 is transmitted to the rotating ring 7 through the power transmission mechanism 10 illustrated in FIG. 5. The rotating ring 7 is rotated in the CCW direction at a lower speed than the movable reel 3. With the rotation of the movable reel 3 in the CCW direction, the cable 5 is unwound from the outer peripheral surface 3a of the movable reel 3 while the cable 5 is wound over the inner peripheral surface 2a of the stationary case 2. On that occasion, a gear ratio between adjacent two of the internal gear 11, the sun gear 12, and the planetary gear 14, which constitute the power transmission mechanism 10, is determined such that a rotational speed of the rotating ring 7 in the CCW direction and a moving speed of the reversing portion 5c of the cable 5 in the CCW direction are matched with each other. Thus, since the reversing-cable passage region 22, which is positioned over the rotating ring 7 in adjacent relation to the first support surface 21a, and the annular elastic member 25 supported by the first support surface 21a are moved in the CCW direction substantially at the same speed as that of the reversing portion 5c, a tension is avoided from unintentionally acting on the cable 5.

When the movable reel 3 is rotated in the CW direction, the cable 5 is wound over the outer peripheral surface 3a of the movable reel 3. Corresponding to the rotation of the movable reel 3, the rotating ring 7 is rotated in the CW direction, and the reversing portion 5c is moved in the CW direction. Therefore, the cable 5 is unwound from the inner peripheral surface 2a of the stationary case 2 and is gradually wound over the movable reel 3. At that time, the reversing-cable passage region 22, which is positioned over the rotating ring 7 in adjacent relation to the first support surface 21a, and the annular elastic member 25 supported by the first support surface 21a are moved in the CW direction substantially at the same speed as that of the reversing portion 5c.

Accordingly, the reversing portion 5c is stably guided by the first support surface 21a through the annular elastic member 25, and stable winding and unwinding operations of the cable 5 are ensured.

As described above with reference to FIG. 7B, the first elastic belt portion 25a and the second elastic belt portion 25b of the annular elastic member 25, which is held to extend along the outer periphery of the support 21, can generate elastic forces acting to react against the forces F1 and F2 exerted in the illustrated directions, respectively. It is preferable that the cable 5 is elastically pressed against the inner peripheral surface 2a of the stationary case 2 by the elastic force generated with the first elastic belt portion 25a, while the cable 5 is elastically pressed against the outer peripheral surface 3a of the movable reel 3 by the elastic force generated with the second elastic belt portion 25b. Stated in another way, when the movable reel 3 is rotated and the rotating ring 7 is rotated following the rotation of the movable reel 3, the cable 5 is stably pressed against the inner peripheral surface 2a and the outer peripheral surface 3a.

As a result, the reversing portion 5c of the cable 5, which passes through the reversing-cable passage region 22, can maintain a smooth curved surface in the projected form, and the reversing portion 5c is less apt to cause distortion or deformation. Hence an excessive frictional force is avoided from acting on respective parts of the reversing portion 5c of the cable 5 and the annular elastic member 25 where they slide against each other.

Furthermore, preferably, the first elastic belt portion 25a and the second elastic belt portion 25b are elastically pressed against the cable 5, thus generating friction between each of the first and second elastic belt portions 25a and 25b and the cable 5. With a resulting frictional force, the annular elastic member 25 held on the support 21 is able to circle around in the CW direction when the rotating ring 7 is rotated in the CCW direction, and to circle around in the CCW direction when the rotating ring 7 is rotated in the CW direction. Because the annular elastic member 25 is able to circle around the support 21, the frictional force between the cable 5 and the annular elastic member 25 is greatly reduced, and the cable 5 is less susceptible to damage. Accordingly, an expensive lubricant is no longer required to be used in such a large amount as used in the related art.

As illustrated in FIG. 7B, in the state where the annular elastic member 25 is fitted to the support 21, the first elastic belt portion 25a and the second elastic belt portion 25b are expanded as denoted by δ1 and δ2, and are rather loosely fitted over the first support surface 21a and the second support surface 21b, respectively. Therefore, the annular elastic member 25 is able to easily circle around the support 21 following the movement of the cable 5.

Figure 6:
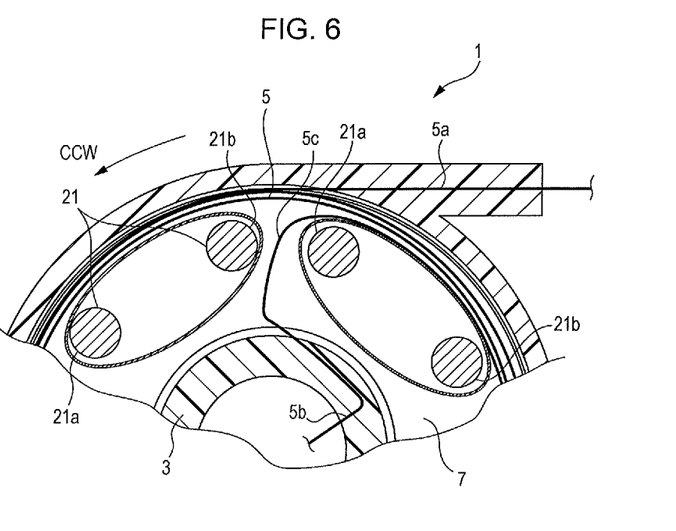
FIG. 6 is a partial sectional plan view illustrating the rotary connector when a movable reel is rotated through a maximum angle.

FIG. 6 illustrates a state where the movable reel 3 is rotated through a maximum angle in the CCW direction. At that time, the support 21 and the annular elastic member 25 on the rotating ring 7 reach their final positions in the CCW direction following the reversing portion 5c of the cable 5. Because the cable 5 is pushed by the support 21 in the CCW direction, the movable reel 3 cannot be further rotated in the CCW direction beyond the state of FIG. 6.

In the structure that the annular elastic member 25 is supported by the support 21, when the movable reel 3 reaches a limit in its rotation, a tension is applied to the cable 5 because the support 21 strikes against the cable 5 with the annular elastic member 25 interposed between them. Therefore, the movable reel 3 is restricted from being not further rotated beyond the limit. Accordingly, in the event that the cable 5 is mounted in a false state, for example, it is possible to confirm, in maintenance work, whether the cable 5 is in a falsely-mounted failure state, by actually rotating the movable reel 3 through a specified rotation angle and checking whether it can be fully rotated through the specified rotation angle.

Figure 8:
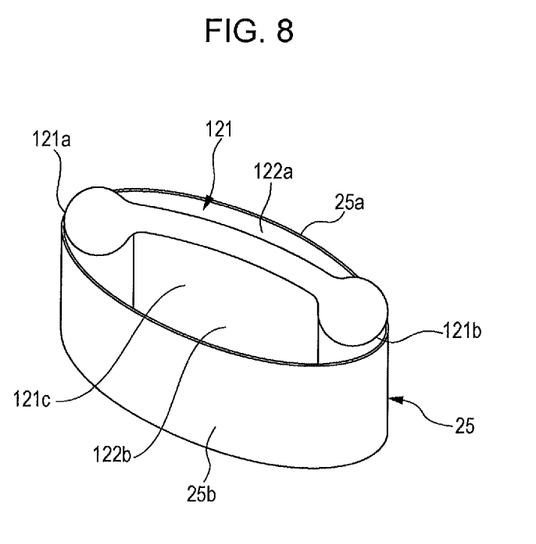
FIG. 8 is a perspective view illustrating a modification of the support disposed on the rotating ring.

FIG. 8 illustrates a modification of the support disposed on the rotating ring 7. In a support 121 illustrated in FIG. 8, a coupling portion 121c is formed between a portion having a first support surface 121a and a portion having a second support surface 121b.

In the modification of FIG. 8, preferably, spaces 122a and 122b are formed between the annular elastic member 25 and the support 121 such that the first elastic belt portion 25a and the second elastic belt portion 25b can be elastically deformed toward the coupling portion 121c.

Figure 9:
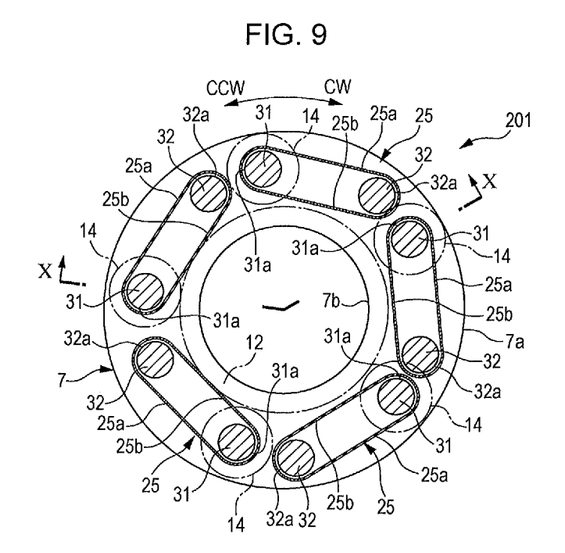
FIG. 9 is a sectional plan view illustrating a rotating ring and an annular elastic member of a rotary connector according to a second embodiment of the present invention.
Figure 10:
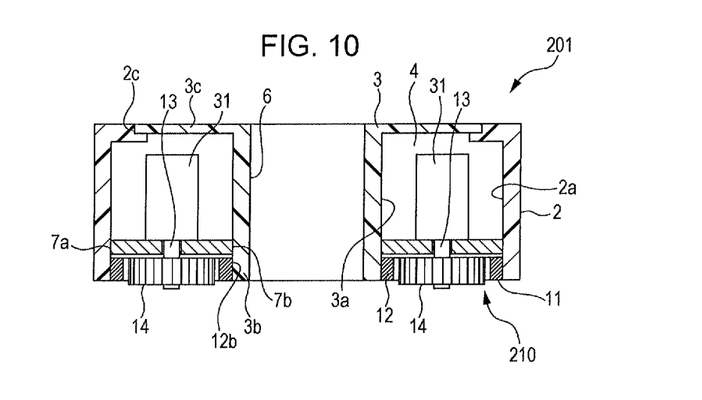
FIG. 10 is a sectional view, taken along a line X-X, illustrating a structure of the rotary connector including the rotating ring, illustrated in FIG. 9.

FIGS. 9 and 10 illustrate a rotary connector 201 according to a second embodiment of the present invention. As illustrated in FIG. 10, in a power transmission mechanism 210 provided in the rotary connector 201, preferably, a plurality of support shafts 13 is rotatably supported on the rotating ring 7, and support rollers 31 are fixed respectively to the support shafts 13 in the laying-out space 4. As illustrated in FIG. 9, plural sets of the support rollers 31 and the support shafts 13 are arranged at intervals of a certain angle in the rotating direction of the rotating ring 7. The planetary gears 14 are fixed respectively to all the support shafts 13 at the lower side of the rotating ring 7, and all the planetary gears 14 are meshed with both the sun gear 12 and the internal gear 11.

In the laying-out space 4, a support 32 is disposed at a position spaced from corresponding one of the support rollers 31 through a certain angle in the CW direction. The support 32 has a shaft- or roller-like shape and is fixed to the rotating ring 7 in a non-rotatable manner. Alternatively, the support 32 may be supported by the rotating ring 7 in a freely rotatable manner. A surface of the support roller 31, the surface facing in the CCW direction, serves as a first support surface 31a, and a surface of the support 32, the surface facing in the CW direction, serves as a second support surface 32a.

The annular elastic member 25 is fitted over the support roller 31 and the support 32. Preferably, a part of the annular elastic member 25, the part being positioned opposite to the stationary case 2, serves as the first elastic belt portion 25a, and a part of the annular elastic member 25, the part being positioned opposite to the movable reel 3, serves as the second elastic belt portion 25b.

In the rotary connector 201 according to the second embodiment, when the movable reel 3 is rotated in the CW direction, the planetary gears 14 meshing with the sun gear 12 are all rotated in the CCW direction. Because the planetary gears 14 are meshed with the internal gear 11, the rotating ring 7 is rotated in the CW direction at a decelerated speed.

The cable 5 is unwound from the inner peripheral surface 2a of the stationary case 2 and is wound over the outer peripheral surface 3a of the movable reel 3. During such a process, since the support roller 31 is rotated in the CCW direction with the rotation of the planetary gear 14, the annular elastic member 25 is able to easily circle around in the CCW direction. Thus, a frictional force generated between the cable 5 and the annular elastic member 25 is greatly reduced, and the cable 5 is less susceptible to damage. Accordingly, an expensive lubricant is no longer required to be used in such a large amount as used in the related art.

When the movable reel 3 is rotated in the CCW direction and the cable 5 is unwound from the movable reel 3 and is wound over the inner peripheral surface 2a of the stationary case 2, a similar operating effect can be obtained. More specifically, since the support roller 31 is rotated in the CW direction and the annular elastic member 25 is caused to circle around in the CW direction, friction between the cable 5 and each of the first elastic belt portion 25a and the second elastic belt portion 25b of the annular elastic member 25 can be reduced.

Figure 11A:
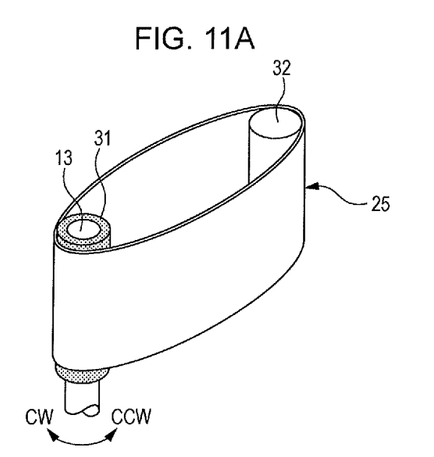
FIGS. 11A and 11B are each a perspective view illustrating a support roller and an annular elastic member of the rotary connector according to the second embodiment.
Figure 11B:
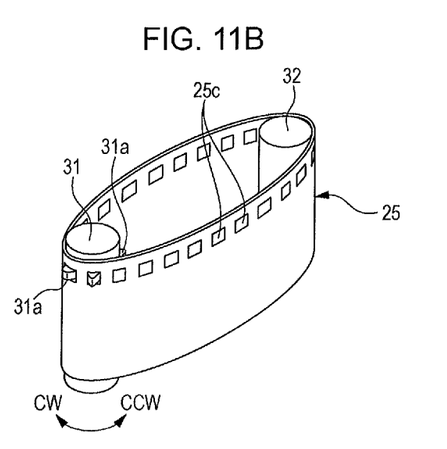

FIGS. 11A and 11B illustrate examples of a preferable structure of the support roller 31. In the example illustrated in FIG. 11A, preferably, the support roller 31 is made of a material having a surface with a high friction coefficient, e.g., rubber, such that a rotating force of the support roller 31 is easily transmitted to the annular elastic member 25. In the example illustrated in FIG. 11B, preferably, bosses 31a constituting sprockets are formed on an outer peripheral surface of the support roller 31 at intervals of a constant angle in a circumferential direction, and driving holes 25c are formed in the annular elastic member 25 at a constant pitch in a direction in which the annular elastic member 25 circles around. Through meshing between the bosses 31a and the driving holes 25c, the rotating force of the support roller 31 can be easily transmitted to the annular elastic member 25. The support 32 may also be driven to rotate together with the support roller 31.

What is claimed is:

1. A rotary connector comprising:
   a stationary case;
   a movable reel rotatably supported to the stationary case;
   a laying-out space defined between an inner peripheral surface of the stationary case and an outer peripheral surface of the movable reel; and
   a cable stored in the laying-out space and having opposite ends fixed to the stationary case and the movable reel; and wherein:
   a rotating ring is arranged between the stationary case and the movable reel, and a power transmission mechanism that rotates the rotating ring by a rotating force of the movable reel;
   the rotating ring includes a first support surface and a second support surface located within the laying-out space and positioned in spaced relation from each other in a rotating direction of the rotating ring, and a first elastic belt portion and a second elastic belt portion between the first support surface and the second support surface, the first elastic belt portion being positioned opposite to the inner peripheral surface of the stationary case and the second elastic belt portion being positioned opposite to the outer peripheral surface of the movable reel;
   the cable extending along the inner peripheral surface of the stationary case is reversed in a reversing-cable passage region adjacent to the first support surface and is wound over the outer peripheral surface of the movable reel; and
   the power transmission mechanism includes a sun gear rotated in union with the movable reel, an internal gear provided at an inner surface of the stationary case, and a planetary gear rotatably supported by the rotating ring and meshed with both the sun pear and the internal gear.

2. The rotary connector according to claim 1, wherein an annular elastic member is fitted over the first support surface and the second support surface, and the first elastic belt portion and the second elastic belt portion are each formed by a part of the annular elastic member.

3. The rotary connector according to claim 2, wherein, when the rotating ring is rotated, the annular elastic member contacting with the cable is caused to circle around while sliding over the first support surface and the second support surface.

4. The rotary connector according to claim 2, wherein at least one of the first support surface and the second support surface is an outer peripheral surface of a support roller rotatably supported on the rotating ring.

5. The rotary connector according to claim 4, wherein the support roller is driven to rotate, following the rotation of the rotating ring, in a direction reversed to the rotating direction of the rotating ring.

6. The rotary connector according to claim 5, wherein
   the support roller is rotated together with the planetary gear.

7. The rotary connector according to claim 1, wherein the first elastic belt portion is in pressure contact with the cable extending along the inner peripheral surface of the stationary case.

8. The rotary connector according to claim 1, wherein the second elastic belt portion is in pressure contact with the cable extending along the outer peripheral surface of the movable reel.

* * * * *